US006752845B2

United States Patent
Haland

(10) Patent No.: US 6,752,845 B2
(45) Date of Patent: Jun. 22, 2004

(54) APPARATUS FOR SEPARATION OF A LIQUID FROM A MULTIPHASE FLUID FLOW

(75) Inventor: Trygve Haland, Tananger (NO)

(73) Assignee: Statoil ASA (NO)

( * ) Notice: Subject to any disclaimer, the term of this patent is extended or adjusted under 35 U.S.C. 154(b) by 0 days.

(21) Appl. No.: 10/169,538

(22) PCT Filed: Dec. 21, 2001

(86) PCT No.: PCT/NO01/00507
§ 371 (c)(1),
(2), (4) Date: Sep. 17, 2002

(87) PCT Pub. No.: WO02/056999
PCT Pub. Date: Jul. 25, 2002

(65) Prior Publication Data
US 2003/0115843 A1 Jun. 26, 2003

(30) Foreign Application Priority Data
Dec. 22, 2000 (NO) .......................... 20006656

(51) Int. Cl.$^7$ .............................. B01D 45/12
(52) U.S. Cl. ............................ 55/340; 55/396; 55/416; 55/433; 55/457
(58) Field of Search .......................... 55/396, 457, 416, 55/338, 339, 340, 433, 432

(56) References Cited

U.S. PATENT DOCUMENTS

| | | | |
|---|---|---|---|
| 2,186,344 A | | 1/1940 | Price |
| 2,506,298 A | * | 5/1950 | Griffen .................. 55/416 |
| 3,793,812 A | * | 2/1974 | Willis .................... 55/338 |
| 3,885,934 A | * | 5/1975 | Eads et al. ............. 55/457 |
| 4,008,059 A | * | 2/1977 | Monson et al. ......... 55/396 |
| 4,261,708 A | | 4/1981 | Gallagher | |
| 6,083,291 A | | 7/2000 | Okada et al. |
| 6,176,900 B1 | | 1/2001 | Swanborn |
| 6,514,322 B2 | * | 2/2003 | West ..................... 95/269 |

FOREIGN PATENT DOCUMENTS

| | | |
|---|---|---|
| EP | 0 344 748 | 12/1989 |
| FR | 1 165 606 | 12/1956 |
| GB | 1 146 262 | 5/1966 |
| GB | 2 219 530 | 12/1989 |
| GB | 2 220 374 | 1/1990 |
| WO | WO 97/49477 | 12/1997 |

* cited by examiner

Primary Examiner—Robert A. Hopkins
(74) Attorney, Agent, or Firm—Pitney Hardin LLP

(57) ABSTRACT

An apparatus for separation of a liquid from a multi-phase fluid flow flowing through a pipeline, wherein the fluid flow is set in rotation so that it is separated into a central zone (5) essentially containing gas, and an outer annular zone (6) essentially containing liquid, and from which the gas and the liquid in the two-zones are discharged via respective outlet means (10, 16). The apparatus comprises an essentially tubular casing (1) arranged to constitute a part of the actual pipeline, a spin element (4) for rotation of the fluid flow being located at the upstream end of the casing (1). The outlet means for the gas comprises an outlet element (10) arranged at the downstream end of the casing (1) and having a central, axially extending passage (11) for the gas, and an outer surface which, together with the inner surface of the casing (1), forms an annulus (12) for the inflow of liquid, a barrier (15) for the liquid being formed at the downstream end of the element (10). The outlet means for the liquid comprises an upwards open container (16) arranged at the downstream end of the casing (1) and adapted to receive liquid which flows into the annulus (12) and partly runs down into the container (16) from the bottom area of the casing (1) at the container opening, and partly falls into the container from the area at said barrier (15).

9 Claims, 1 Drawing Sheet

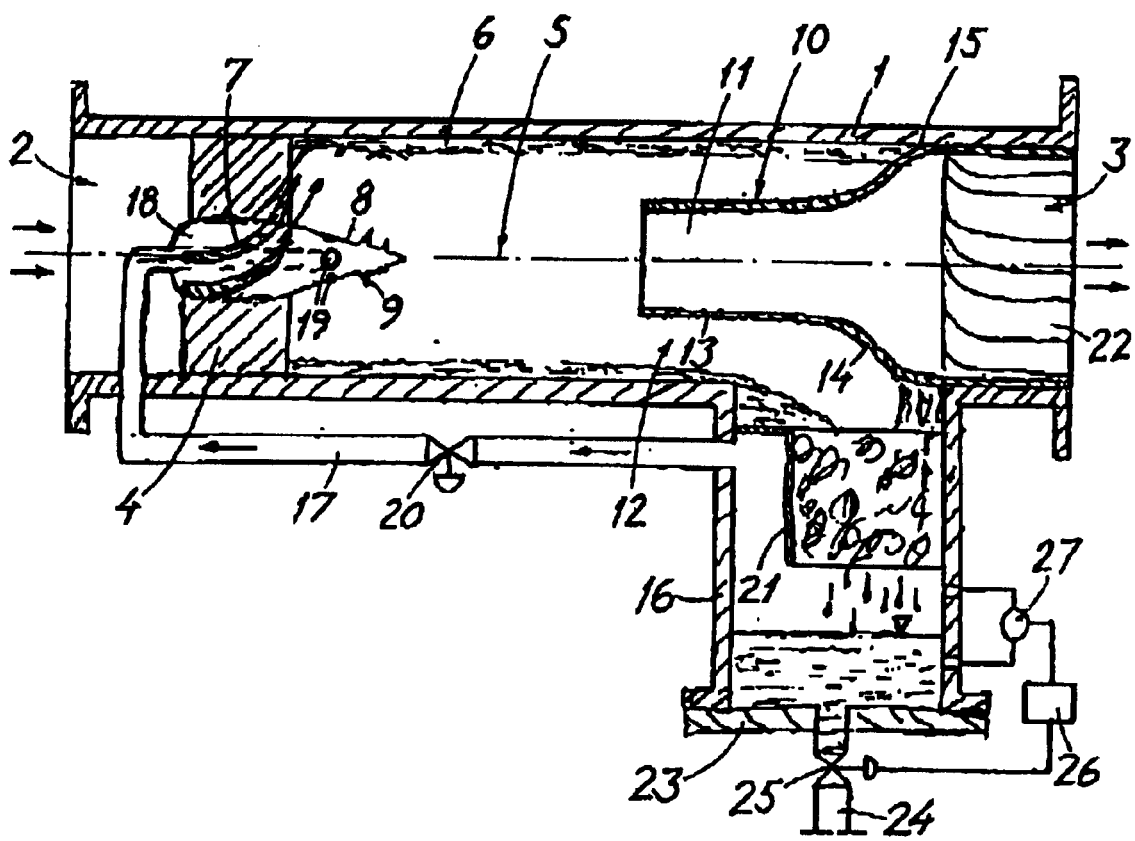

APPARATUS FOR SEPARATION OF A LIQUID FROM A MULTIPHASE FLUID FLOW

BACKGROUND OF THE INVENTION

1. Field of the Invention

The invention relates to an apparatus for separation of a liquid from a multiphase fluid flow flowing through a pipeline, wherein the fluid flow is set in rotation so that it is separated into a central zone essentially containing gas, and an outer annular zone essentially containing liquid, and from which the gas and the liquid in the two zones are discharged via respective outlet means.

2. Description of the Prior Art

In offshore recovery of hydrocarbons (oil and gas), the produced fluids are often transported in relatively long pipelines and risers up from the seabed to the relevant production platform. The produced fluids usually consist of liquid (oil and water) in which gas and vapour are dissolved. In this connection different types of separation equipment are used for bulk separation of liquid from a flowing gas/vapour phase.

As mentioned in the introduction, it is known to separate a fluid flow into liquid and gas by the use of cyclone technique. The separation equipment used today is, however, relatively heavy and space-demanding, and is associated with relatively high building costs.

Thus it is an object of the invention to provide a separation apparatus of the relevant type wherein the apparatus has a compact construction at the same time as it is simple with respect to manufacture, installation and regulation.

SUMMARY OF THE INVENTION

For the achievement of the above-mentioned object there is provided an apparatus of the introductorily stated type which, according to the invention, is characterised in that it comprises an essentially tubular casing arranged to constitute a part of the actual pipeline, a spin element for rotation of the fluid flow being located at the upstream end of the casing, that the outlet means for the gas comprises an outlet element arranged at the downstream end of the casing and having a central, axially extending passage for the gas, and an outer surface which, together with the inner surface of the casing, forms an annulus for the inflow of liquid, a barrier for the liquid being formed at the downstream end of the element, and that the outlet means for the liquid comprises an upwards open container arranged at the downstream end of the casing and adapted to receive liquid which flows into the annulus and partly runs down into the container from the bottom area of the casing at the container opening, and partly falls into the container from the area at said barrier.

With the present invention there is provided an apparatus making use of "in-line" technology to separate a fluid flow in a pipeline. The apparatus is based on the cyclone principle and is provided with an axial spin element simplifying the "in-line" method in that the supplied fluid flow and the separated gas fraction can flow in the pipeline axially into and out of the tubular casing. In this manner the casing can be simply installed in a straight pipeline stretch without any substantial modification of the existing pipe geometry.

The apparatus according to the invention can be used as an inlet arrangement to scrubbers and separators in order to improve the performance of such equipment. Further, the apparatus can be used as a stand-alone unit in pipes and pipelines in oil/gas wells, in pipelines on shore or on the seabed, or in processing plants on the shore or offshore.

In most cases the apparatus can be built with the same nominal diameter and specification as for the pipeline in which the separation is carried out. This will keep the costs down in application of the technology, and will considerably reduce the complexity of the relevant installations in relation to conventional separation technology. This will be the case with installations in new plants and pipelines, but the profit probably will be even larger when utilising the technology in existing plants and pipelines.

The advantages of an apparatus constructed in accordance with the invention can be summarised as follows:

1. Low weight in relation to conventional scrubbers and separators or slug catchers.
2. Low building costs in relation to the above-mentioned equipment.
3. The fact that one uses a pipeline as such for the separation apparatus, makes it possible to build the apparatus with very small dimensions.
4. The apparatus can be built according to the current pipe specification, so that protection equipment does not become necessary, as is the case for conventional pressure tanks in processing plants.
5. The actual separation of liquid from the gas/vapour phase takes place without the gas/vapour phase changing main direction. This results in that the pressure loss through the apparatus can be kept low at the same time as the separation of liquid takes place.
6. The apparatus can be installed horizontally as well as vertically with certain construction modifications.
7. The apparatus to a great extent is self-regulating, so that there is no need for complicated regulating means. Nevertheless, control of the apparatus with a regulating means may be appropriate in some applications.

BRIEF DESCRIPTION OF THE DRAWING

The invention will be further described below in connection with an exemplary embodiment with reference to the drawing of which the only FIGURE shows a schematic, axially sectioned side view of an apparatus according to the invention.

DETAILED DESCRIPTION OF THE PREFERRED EMBODIMENTS

As appears from the drawing, the apparatus (hereinafter also called liquid separator) according to the invention comprises a cylindrical tubular casing 1 which is intended for connection into a pipeline (not shown), so that the casing constitutes a part (an "in-line" element) of the pipeline proper. The casing 1 has an inlet end 2 for the supply of a two-phase mixture of liquid and gas/vapour, and an outlet end 3 where the gas phase leaves the casing 1, in both cases in the axial direction of the casing.

In the inlet end there is arranged a spin element 4 which, with rotation of the element, sets the two-phase mixture in rotation, so that by centrifugal action one obtains separation of the two-phase mixture into a gas phase in a central zone 5 in the casing, and a liquid phase in an annular outer zone 6 at the inner surface of the casing.

The spin element normally has the same diameter as the inner diameter of the casing 1, as in the shown embodiment. However, this may be departed from up or down if it is found to be appropriate for a definite application.

The spin element 4 itself fits snugly to the inner surface of the casing, to avoid a direct passing of gas/vapour and liquid which would disturb the separation process proper downstream of the spin element. The spin element comprises guide vanes 7 changing the direction of the fluid, so that centrifugal forces arise flinging the liquid outwards towards the casing wall. The pitch angle and design of the vanes may vary, dependent on the application.

In order to further improve the inlet conditions in the liquid separator, a mixing element (not shown) of a commercially available type may be installed upstream of the spin element 4.

As shown in the drawing, the spin element 4 at its downstream end is formed with an aerodynamic, concentric end part 8 which is tapered towards the downstream end. This end part is provided with a number of circumferentially extending, annular lips 9 which are to ensure that the cyclone flow downstream of the spin element 4 gets a pressure profile which is as optimal as possible. The lips serve as liquid stoppers preventing liquid from creeping along the root of the spin element into the "eye" of the cyclone where there are small or no centrifugal forces which can fling liquid in the direction towards the casing wall.

The outlet means for the gas in the central zone 5 comprises an outlet element 10 arranged at the downstream end of the casing 1 and having a central, axially extending passage 11 for the gas, and an outer surface which, together with the opposite inner surface of the casing, define an annulus 12 for the inflow of liquid in the outer zone 6. In the shown embodiment, the outlet element 10 is a tubular element having a cylindrical upstream portion 13 and a downstream portion 14 diverging from this portion and being sealingly connected to the casing 1, for the formation of a barrier 15 for the liquid at the downstream end of the annulus.

The design of the outlet element 10 can be adapted to the relevant application and to the liquid/gas/vapour ratio and the properties of the fluids, in order to obtain an optimum relation between separation efficiency and pressure drop through the liquid separator.

As shown, the outlet means for the liquid comprises an upwards open container 16 which is arranged at the downstream end of the casing 1 and is adapted to receive liquid which flows into the annulus 12 and partly runs down into the container 16 from the bottom area of the casing at the container opening, and partly falls into the container from the area at said barrier 15.

As appears from the drawing, an upper portion of the container 16 and a central portion of the upstream end of the spin element 4 are interconnected by means of a line 17 for recirculation of gas which is entrained by liquid running or falling into the container. The spin element is provided with a central cavity 18 communicating with the line 17, and further is provided with a number of openings 19 in the form of small holes or slots for the discharge of recirculated gas from the cavity 18. A valve 20 is connected in the recirculation line 17, for control of the quantity of recirculated gas.

As shown, the inlet opening of the conduit 17 from the container 16 is shielded by means of a partition 21 projecting a distance into the container from the inlet opening thereof, so that liquid is prevented from getting into the conduit.

The recirculation of gas is obtained by utilisation of the negative pressure arising at the centre of the cyclone. This recirculation will improve the liquid drainage out of the casing of the liquid separator. As mentioned, the quantity of recirculated gas can be controlled by means of the valve 20, in order to find the optimum operating condition for the relevant application. Because of the negative pressure arising at the inlet of the conduit 17, the recirculation gas will also contribute to drawing separated liquid into the container 16.

The gas which is guided out of the casing 1 via the outlet element 10, still has a rotating movement in the central passage 11. In order to repeal the rotating movement, the gas outlet may be provided with an antispin element if this is found to be appropriate for flow-technical reasons in some applications. In the illustrated embodiment such an element 22 is arranged at the downstream end of the outlet element 10.

In the illustrated embodiment the bottom 23 of the container is provided with a liquid outlet pipe 24 in which there is connected a valve 25 for control of the liquid quantity which is delivered from the container and which is conducted to a suitable place in the relevant processing plant or production system. The control valve 25 is arranged to be controlled by means of a level controlling unit 26 which is connected to a level gauge 27 for measuring the liquid level in the container. The level gauge may be of a suitable conventional type, e.g. a PD meter.

The container 16 for example may be a separator, a scrubber or a T-pipe element, dependent on the relevant application. The container possibly may be equipped with a more or less advanced drip catcher, for drying the recirculation gas to an appropriate level, dependent on the application.

For achieving an optimum monitoring of the liquid separator, this may be equipped with pressure sensors (not shown) before the spin element 4, in the cyclone body, after the gas outlet element 10 and in the liquid container 16. These sensors may be of a conventional type and will provide valuable information as to how the liquid separator operates in a definite application and under varying operating conditions. The signals from the sensors may be used together with the level measurement in the liquid container to prepare an optimum automated control algorithm for a definite application.

In the simplest application of the liquid separator, as for example in the inlet of a separator or scrubber, there will on the whole not be any need for monitoring or control of the apparatus. In such applications one will only design the liquid separator in order to function in the best possible manner within a defined operating area and a defined set of operating conditions.

I claim:

1. An apparatus for separation of a liquid from a multiphase fluid flow flowing through a pipeline, wherein a fluid flow is set in rotation so that said fluid flow is separated into a central zone (5) essentially containing gas, and an outer annular zone (6) essentially containing liquid, and from which the gas and the liquid in the two zones are discharged via respective outlet means (10, 16), said apparatus comprising:

an essentially tubular casing (1) arranged to constitute a part of the actual pipeline, a spin element (4) for rotation of the fluid flow being located at the upstream end of the casing (1), an outlet element (10) arranged at the downstream end of the casing (1) and having a central, axially extending passage (11) for the gas, and an outer surface which, together with the inner surface of the casing (1), forms an annulus (12) for the inflow of liquid, a barrier (15) for the liquid being formed at the downstream end of the element (10), and an upwards open container (16) arranged at the downstream end of the casing (1) and adapted to receive liquid which flows into the annulus (12) and partly runs down into the container (16) from the bottom area of the casing (1) at the container opening, and partly falls into the container (16) from the area at said barrier (15), wherein an upper portion of the container (16) and a central portion of the upstream end of the spin element (4) are interconnected by means of a line (17) for recirculation of gas entrained by liquid running or falling into the container (16), the spin element (4) having a central cavity (18) and being provided with a number of openings (19) for the discharge of recirculated gas from the cavity (18).

2. An apparatus according to claim 1, characterised in that the outlet element (10) is a tubular element having a cylindrical upstream portion (13) and a downstream portion (14) diverging from this portion and being sealingly connected to the casing (1), for the formation of said barrier (15).

3. An apparatus according to claim 1, characterised in that an antispin element (22) is arranged at the downstream end of the gas outlet element (10).

4. An apparatus according to claim 1, characterised in that a valve (20) for control of the quantity of recirculated gas is connected in the recirculation line (17).

5. An apparatus according to claim 1, characterised in that the spin element (4) at its downstream end is formed with an aerodynamic, concentric end part (8).

6. An apparatus according to claim 5, characterised in that the spin element (4) at its downstream end is provided with a number of circumferentially extending, annular lips (9) serving as liquid stoppers.

7. An apparatus according to claim 1, characterised in that the container (16) in its bottom area has a liquid outlet pipe (24) in which there is connected a control valve (25) for the control of delivered liquid quantity from the container.

8. An apparatus according to claim 7, characterised in that the control valve (25) is arranged to be controlled by means of a level controlling unit (26) connected to a level gauge (27) measuring the level of liquid in the container.

9. An apparatus for separation of a liquid from a multiphase fluid flow flowing through a pipeline, wherein a fluid flow is set in rotation so that said fluid flow is separated into a central zone (5) essentially containing gas, and an outer annular zone (6) essentially containing liquid, and from which the gas and the liquid in the two zones are discharged via respective outlet means (10, 16), said apparatus comprising:

an essentially tubular casing (1) arranged to constitute a part of the actual pipeline, a spin element (4) for rotation of the fluid flow being located at the upstream end of the casing (1), an outlet element (10) arranged at the downstream end of the casing (1) and having a central, axially extending passage (11) for the gas, and an outer surface which, together with the inner surface of the casing (1), forms an annulus (12) for the inflow of liquid, a barrier (15) for the liquid being formed at the downstream end of the element (10), and an upwards open container (16) arranged at the downstream end of the casing (1) and adapted to receive liquid which flows into the annulus (12) and partly runs down into the container (16) from the bottom area of the casing (1) at the container opening, and partly falls into the container (16) from the area at said barrier (15), wherein the spin element (4) has a downstream end formed with an aerodynamic, concentric end part (8), said downstream end being further provided with a number of circumferentially extending, annular lips (9) serving as liquid stoppers.

* * * * *